(12) United States Patent
Iwanaga et al.

(10) Patent No.: US 8,135,401 B2
(45) Date of Patent: Mar. 13, 2012

(54) MOBILE STATION AND COMMUNICATION SYSTEM SELECTION METHOD

(75) Inventors: Mitsuo Iwanaga, Yokohama (JP); Kunio Yoshikawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 905 days.

(21) Appl. No.: 12/125,443

(22) Filed: May 22, 2008

(65) Prior Publication Data
US 2008/0299968 A1   Dec. 4, 2008

(30) Foreign Application Priority Data
May 29, 2007   (JP) ................ P2007-142337

(51) Int. Cl.
*H04W 4/00* (2009.01)
*H04W 36/00* (2009.01)

(52) U.S. Cl. ............... 455/434; 455/435.2; 455/437

(58) Field of Classification Search .......... 455/434, 455/435.1–435.2, 437
See application file for complete search history.

(56) References Cited

U.S. PATENT DOCUMENTS

| | | | |
|---|---|---|---|
| 2003/0045291 | A1 | 3/2003 | Watanabe |
| 2006/0046723 | A1 | 3/2006 | Liu |
| 2009/0082018 | A1* | 3/2009 | Biniguer ............ 455/435.2 |

FOREIGN PATENT DOCUMENTS

| | | |
|---|---|---|
| EP | 0 781 064 A2 | 6/1997 |
| JP | 7-312771 | 11/1995 |
| JP | 2001-78257 | 3/2001 |
| JP | 2002-300658 | 10/2002 |
| JP | 2003-169359 | 6/2003 |
| JP | 2004-328153 | 11/2004 |
| JP | 2006-148587 | 6/2006 |
| JP | 2006-173778 | 6/2006 |
| JP | 2006-229384 | 8/2006 |
| KR | 2001-13397 | 2/2001 |

OTHER PUBLICATIONS

Office Action issued Apr. 8, 2011 in China Application No. 200810108856.5 (With English Translation).

* cited by examiner

*Primary Examiner* — Michael Thier
(74) *Attorney, Agent, or Firm* — Oblon, Spivak, McClelland, Maier & Neustadt, L.L.P.

(57) ABSTRACT

The present invention provides a mobile station which can perform communication using a specific communication system such as HSDPA and HSUPA, with priority, and a communication system selection method thereof. The mobile station for performing communication using a specific communication system includes: a transmission/reception unit for receiving broadcast information from a plurality of communication base stations; an acquisition unit for acquiring a plurality of pieces of cell information on cells which the mobile station can camp on and on a communication systems which can be used in the cells; and a control unit for selecting one cell where the specific communication system can be used from the plurality of pieces of cell information acquired by the acquisition unit, and performing processing for the mobile station to camp on this cell. By using this mobile station, communication using a specific communication system such as HSDPA or HSUPA can be performed with priority.

6 Claims, 8 Drawing Sheets

MOBILE STATION AND COMMUNICATION SYSTEM SELECTION METHOD

BACKGROUND OF THE INVENTION

1. Field of the Invention

The present invention relates to a mobile station for performing communication using a specific communication system, and a communication system selection method thereof.

2. Related Background Art

Technologies to perform communication under specific conditions with priority, including communication using a specific communication system such as HSDPA (High-Speed Downlink Packet Access) and HSUPA (High-Speed Uplink Packet Access), and communication via a specific base station subject to better radio conditions, are under consideration. For example, Japanese Patent Application Laid-Open No. 2006-148587 discloses a mobile station which changes a switching destination to a specific basic station with priority if the radio conditions of this specific base station are better than an active base station.

According to this mobile station, if a received signal level of radio waves from an active base station is a specific level or higher when monitoring base stations of which radio conditions are better, only the received signal levels of radio waves from neighboring base stations that can support packet communication notified by a broadcast information sent from this base station are measured, and measurement of received signal levels of radio waves from neighboring base stations which do not support packet communication is omitted. By this, power consumption at cell switching time in a mobile station is decreased.

According to the technology disclosed in Japanese Patent Application Laid-Open No. 2006-148587, if there is a specific base station of which radio conditions are better, the cell where the mobile station exists can be switched to the cell under this specific base station with priority. However, it is not judged whether communication using such a specific communication method as HSDPA or HSUPA is possible or not in this switching destination cell.

Since it is judged whether a cell is switched or not only by radio conditions, a mobile station may not be able to camp on a cell in which communication using a specific communication system, such as HSDPA or HSUPA, is possible, even if the mobile station exists in a position where camping on is possible.

SUMMARY OF THE INVENTION

To solve this problem, it is an object of the present invention to provide a mobile station which can perform communication using a specification communication system, such as HSDPA or HSUPA, and a communication method selection method.

To achieve the above object, a mobile station according to the present invention is a mobile station for performing communication using a specific communication system, comprising: reception unit for receiving broadcast information from a plurality of communication base stations; acquisition unit for acquiring a plurality of pieces of cell information on cells which the mobile station can camp on and on communication systems which can be used in the cells from the broadcast information received by the reception unit, and selection processing unit for selecting one cell where the specific communication system can be used from the plurality of pieces of cell information acquired by the acquisition unit, and performing processing for the mobile station to camp on the cell.

In the mobile station according to the present invention, the acquisition unit acquires a plurality of pieces of cell information on cells which the mobile station can camp on and on communication systems which can be used in the cells from the broadcast information received by the reception unit. Then the selection processing unit selects one cell where the specific communication system can be used is selected from the cell information, and performs processing for the mobile station to camp on this cell. By this, the mobile station camps on a cell where the specific communication system can be used, so a communication using a specific communication system, such as HSDPA or HSUPA, can be performed with priority.

It is preferable that the mobile station further comprises storage unit for storing history information of camped cells which the mobile station camps on, wherein the selection processing unit selects one cell where the specific communication system can be used from the plurality of pieces of cell information based on the history information of camped cells stored in the storage unit, and performs processing for the mobile station to camp on the cell. By this, a cell where the specific communication system can be used is selected based on the history information of camped cells which the mobile station has camped on. Therefore, a cell which is most appropriate to perform communication using the specific communication system can be selected based on the history information of camped cells.

It is preferable that the storage unit deletes the history information of camped cells which satisfies at least one condition out of a condition that a predetermined time has elapsed since the history information of camped cells is stored, and a condition that a processing by the selection processing unit has been performed a predetermined number of times. By this, the history information of camped cells which satisfies at least one of these two conditions is deleted. As a result, the history information of camped cells which the mobile station has not camped on until at least one of these two conditions is satisfied is deleted, and a cell which is most appropriate to perform communication using the specific communication system can be selected.

It is preferable that the mobile station further comprises input unit for inputting a correction value for correcting, in an increasing direction, a received signal level of the broadcast information in a cell indicated by the history information of camped cells stored in the storage unit, wherein the selection processing unit selects one cell where the specific communication system can be used from the plurality of pieces of cell information based on the received signal level corrected using a correction value which is input by the input unit, and performs processing for the mobile station to camp on the cell. By this, the selection processing unit selects a cell where the specific communication system can be used from the cell information based on the received signal level corrected using the correction value which is input by the input unit, and performs processing for the mobile station to camp on this cell. As a result, the mobile station can camp on the specific cell by adjusting the correction value to be input to the input unit.

It is also preferable that the mobile station further comprises memorizing unit for pre-storing correction values for correcting, in an increasing direction, a received signal level of the broadcast information in a cell indicated by the history information of camped cells stored in the storage unit, wherein the selection processing unit selects one cell where the specific communication system can be used from the plurality of pieces of cell information based on the received signal level corrected by the correction value which is stored in the memorizing unit, and performs processing for the mobile station to camp on this cell. By this, the selection processing unit selects a cell where the specific communication system can be used from the cell information based on the received signal level corrected by the correction value which is pre-stored in the memorizing unit, and performs processing for the mobile station to camp on this cell. As a result, the mobile station can camp on the specific cell by adjusting the correction value to be pre-stored in the memorizing unit.

It is also preferable that the specific communication system is at least one of HSDPA and HSUPA. By this, the mobile station can perform communication using at least one communication system of HSDPA and HSUPA with priority.

To achieve the above object, a communication system selection method according to the present invention is a communication system selection method using a mobile station which performs communication using a specific communication system, comprising: a reception step of the mobile station receiving broadcast information from a plurality of communication base stations; an acquisition step of the mobile station acquiring a plurality of pieces of cell information on cells which the mobile station can camp on and on communication systems which can be used in the cells from the broadcast information received in the reception step; and a selection processing step of the mobile station selecting one cell where the specific communication system can be used from the plurality of pieces of cell information acquired in the acquisition step based on history information of camped cells stored in the storage unit for storing the history information of camped cells which the mobile station has camped on, and the mobile station performing processing for the mobile station to camp on the cell.

According to the communication system selection method of the present invention, the mobile station acquires a plurality of pieces of cell information on cells which the mobile station can camp on and on communication systems which can be used in the cells in the acquisition step, based on the broadcast information received in the reception step. Then based on the history information of camped cells stored in the storage unit, the mobile station selects one cell where the specific communication system can be used, and performs processing to camp on this cell in the selection processing step. By this, the mobile station camps on a cell where the specific communication system can be used, so a communication using a specific communication system, such as HSDPA or HSUPA, can be performed with priority. Also a cell where the specific communication system can be used is selected based on the history information of camped cells which the mobile station has camped on. Therefore a cell which is most appropriate to perform communication using the specific communication system can be selected based on the history information of camped cells.

According to the present invention, a mobile station which can perform communication using a specific communication system such as HSDPA and HSUPA, with priority, and a communication system selection method thereof, can be provided.

DESCRIPTION OF THE PREFERRED EMBODIMENTS

Preferred embodiments of the present invention will now be described with reference to the accompanying drawings. In the description of the drawings, the same composing elements are denoted with the same reference symbols, where redundant description is omitted.

Figure 1:
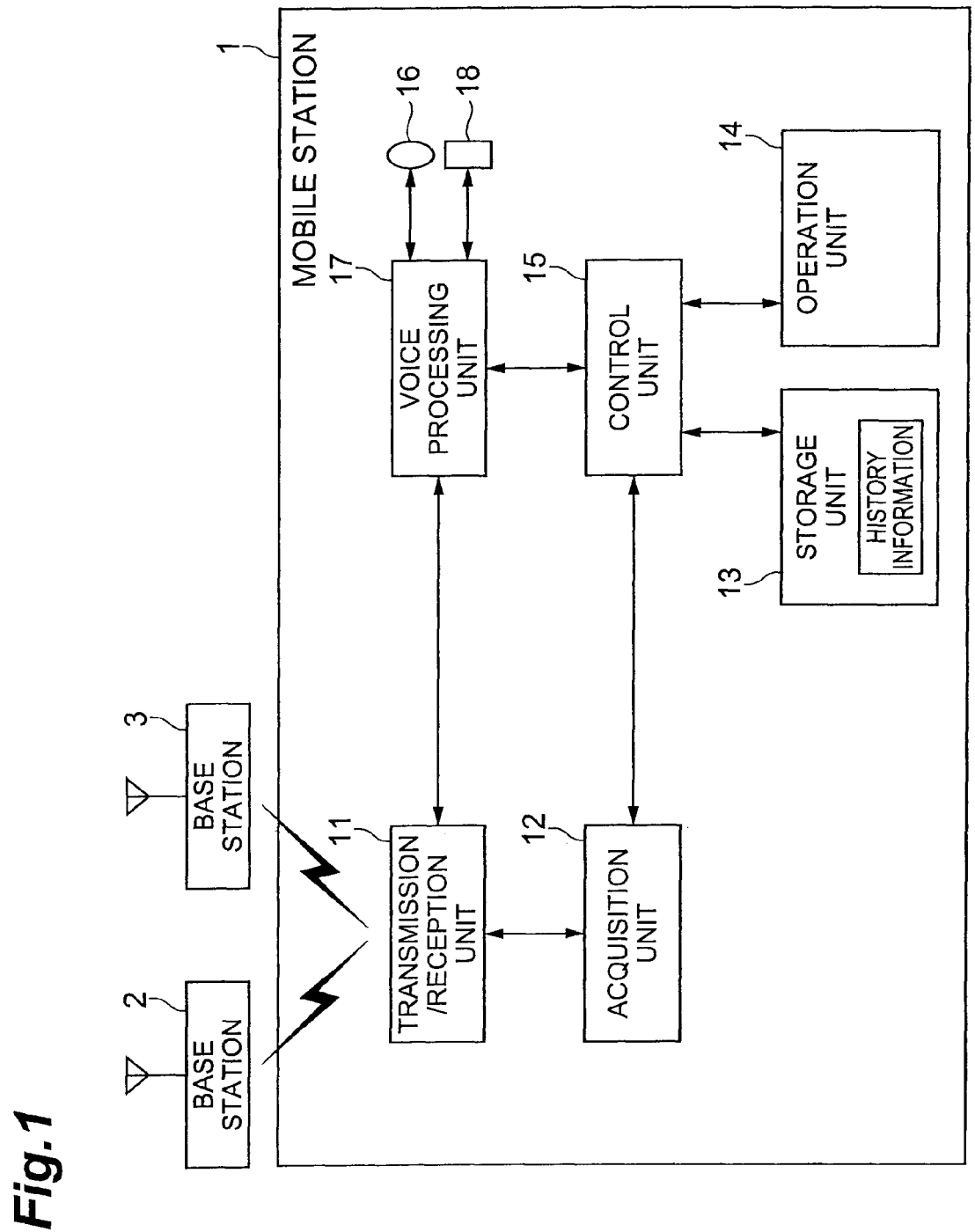
FIG. 1 is a diagram depicting a functional configuration of a mobile station according to an embodiment.
Figure 2:
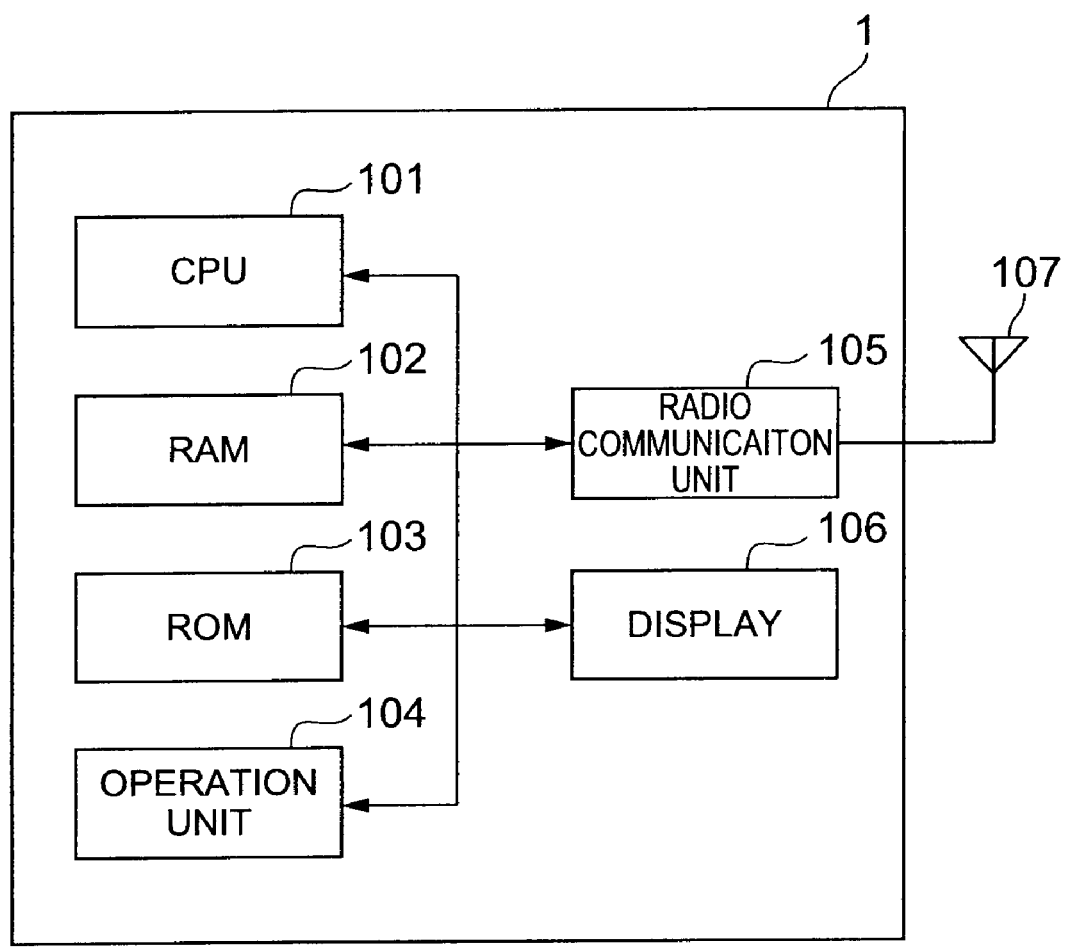
FIG. 2 is a diagram depicting a function configuration of a physical configuration of the mobile station according to the embodiment.

First the configuration of a mobile station according to the present embodiment will be described. FIG. 1 is a diagram depicting the functional configuration of the mobile station of the embodiment, and FIG. 2 is a diagram depicting the physical configuration of the mobile station of the embodiment. The mobile station 1 is such a device as a mobile station and personal computer for performing communication using a specific communication system, HSDPA (High-Speed Downlink Packet Access) or HSUPA (High-Speed Uplink Packet Access) for example, with priority. As FIG. 2 shows, the mobile station 1 is comprised of a CPU 101, RAM 102, ROM 103, operation unit 104, radio communication unit 105, display 106, antenna 107 and other hardware. By operation of these composing elements, each function, to be described below, is implemented. As shown in FIG. 1, the mobile station 1 has, as functional composing elements, a transmission/reception unit 11 (reception unit), acquisition unit 12 (acquisition unit), storage unit 13 (storage unit, memorizing unit), operation unit 14 (input unit), control unit 15 (selection processing unit), microphone 16, voice processing unit 17 and speaker 18.

The transmission/reception unit 11 is a portion for receiving broadcast information from a plurality of communication base stations 2 and 3 respectively. The broadcast information is information which the plurality of communication base stations 2 and 3 broadcast to the mobile station 1 which exists in a communication area of the communication base stations 2 and 3. This broadcast information includes information on cells managed by the communication base stations 2 and 3 respectively (e.g. information for specifying cells which the mobile station 1 can camp on, and information on communication systems which can be used in the cells).

The acquisition unit 12 is a portion for extracting and acquiring a plurality of pieces of cell information from the plurality of broadcast information received by the transmission/reception unit 11. The cell information is information on cells which the mobile station 1 can camp on, and information on communication system which can be used in the cells. An example of the communication system which can be used in the cells is HSDPA or HSUPA.

The storage unit 13 is a portion for storing history information (history information of camped cells) (e.g. such a memory as RAM). The history information is information on the camped cells which the mobile station 1 has actually camp on. If the mobile station 1 camps on a cell, the storage unit 13 stores information on this cell, as a camped cell.

The storage unit 13 also deletes history information, which satisfies at least one condition out of a condition that a predetermined time has elapsed since the history information is stored, and a condition that a later mentioned camping process has been performed a predetermined number of times by the control unit 15 (that is, erases it from the storage area).

The storage unit 13 also pre-stores later mentioned correction values.

The operation unit 14 is a portion for a user of a mobile station 1 to input a correction value. The correction value is a value for correcting, in an increasing direction, the received signal level of the broadcast information in the cell indicated by the history information stored in the storage unit 13.

The control unit 15 is a portion for selecting one cell where a specific communication system can be used from a plurality of pieces of cell information acquired by the acquisition unit 12, and performing a camping process for the selected cell. The camping process is processing required for the mobile station 1 to camp on a selected cell. The specific communication system is predetermined in the storage unit 13, and is at least one of HSDPA and HSUPA, for example.

The control unit 15 also selects one cell where a specific communication system can be used from a plurality of pieces of cell information based on the history information stored in the storage section 13, and performs the camping process for the selected cell. By this, a most appropriate cell to perform communication using the specific communication system can be selected based on the history information of camped cells.

The control unit 15 also corrects a received signal level by a correction value which is input via the operation unit 14, selects one cell where a specific communication system can be used from a plurality of pieces of cell information based on the corrected received signal level, and performs camping process for the selected cell. By this, the user of the mobile station 1 can adjust the correction value and make the mobile station 1 camp on the desired specific cell.

The control unit 15 also corrects a received signal level by a correction value pre-stored in the storage unit 13, selects one cell where a specific communication system can be used from a plurality of pieces of cell information, and performs camping process for the selected cell based on the corrected received signal level. By this, the user of the mobile station 1 can adjust the correction value and make the mobile station 1 camp on the desired specific cell.

The microphone 16 is a portion for converting the voice of the user of the mobile station 1 into electric signals, and outputting it to the voice processing unit 17. The voice processing unit 17 is a portion for performing such processing as noise removal from electric signals which are output from the microphone 16, and outputting the processed electric signals to the speaker 18. The speaker 18 is a portion for converting the electric signals, which are output from the voice processing unit 17, into voice.

Figure 3:
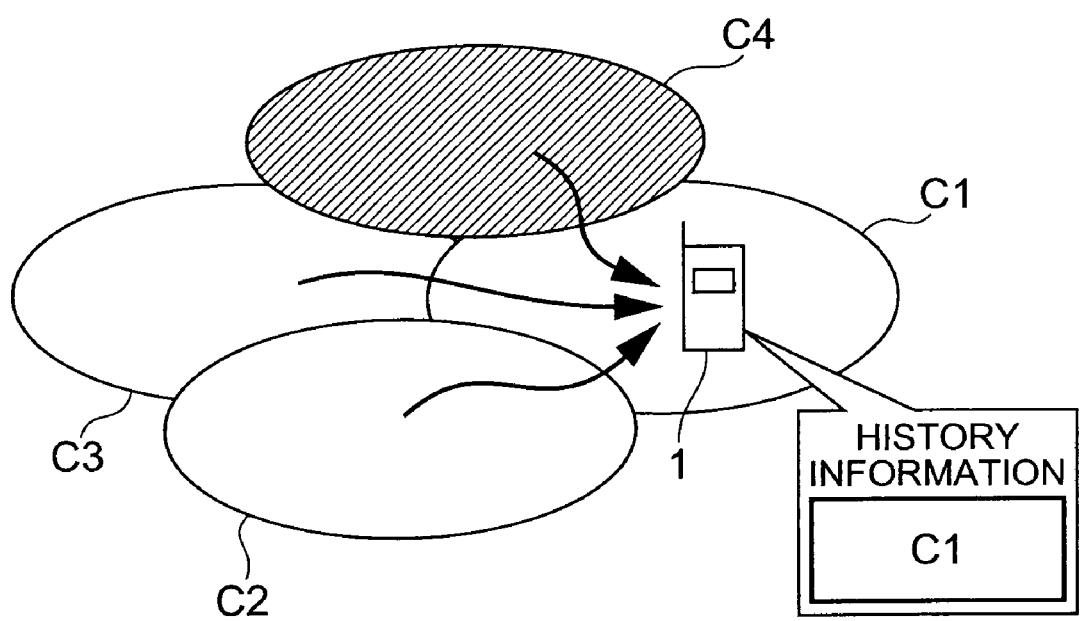
FIG. 3 is a diagram depicting a history information storage method.
Figure 4:
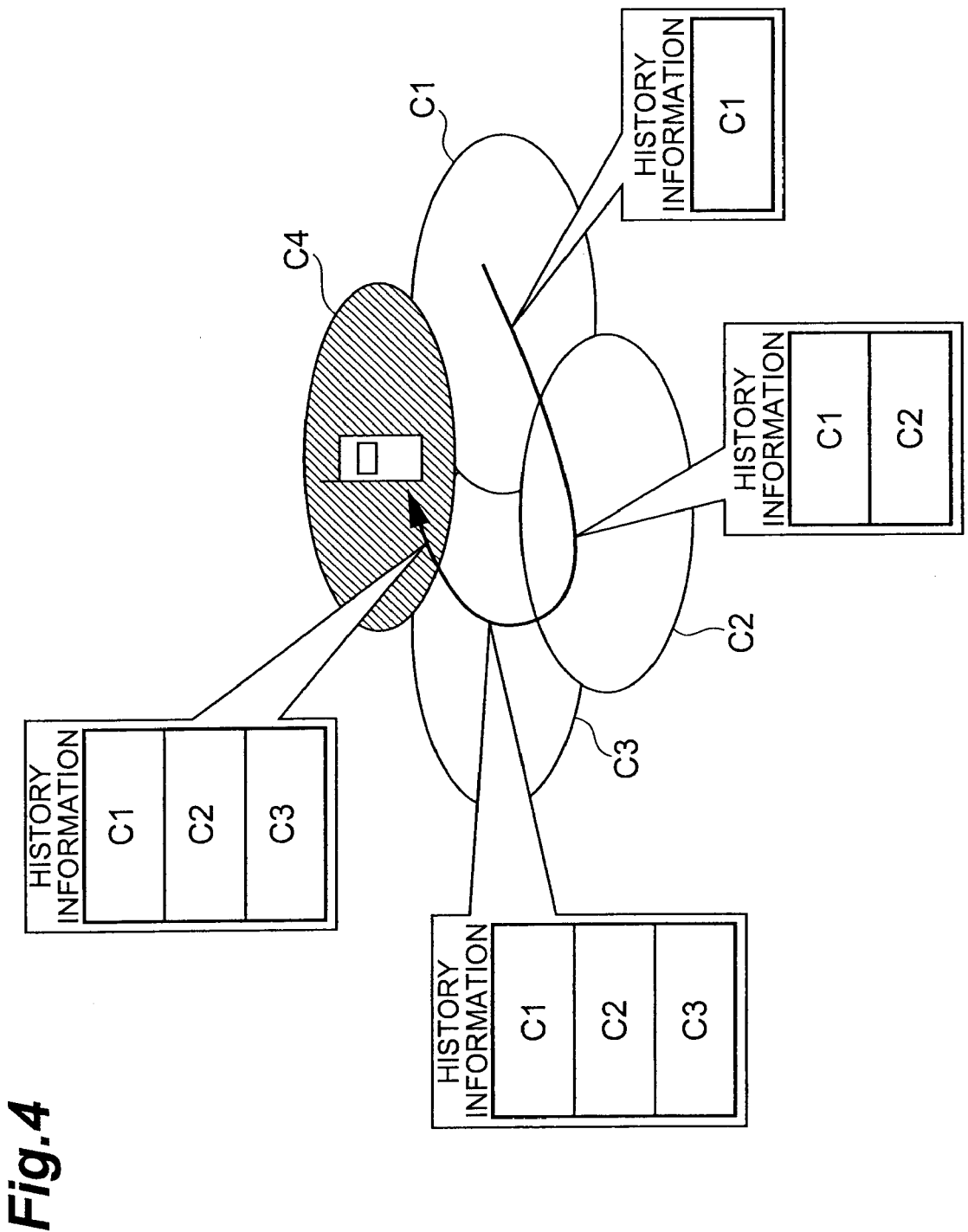
FIG. 4 is a diagram depicting a history information storage method.
Figure 5:
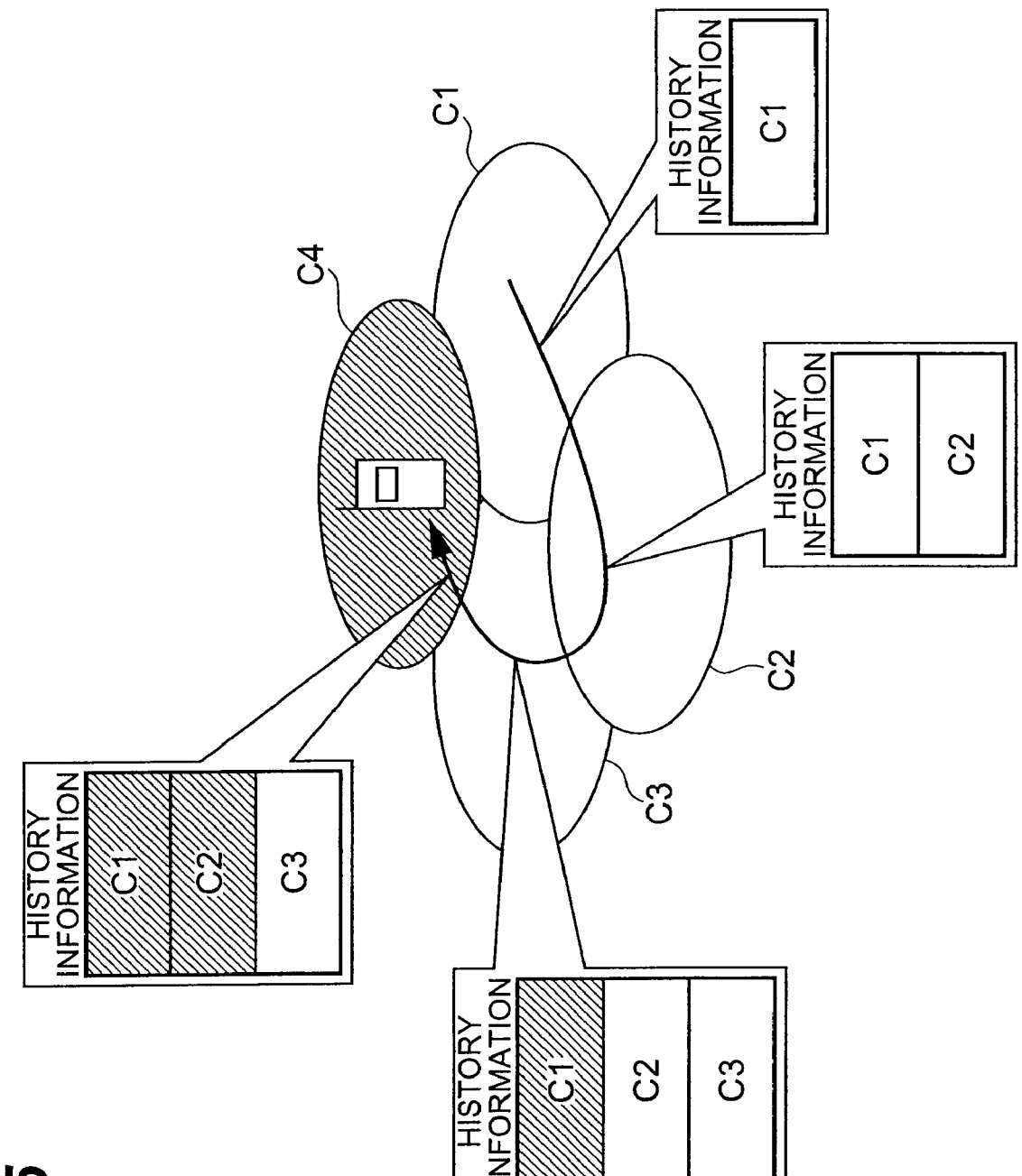
FIG. 5 is a diagram depicting a history information storage method.

Now a method for the storage unit 13 storing history information will be described. FIG. 3 to FIG. 5 are diagrams depicting a history information storage method by the storage unit 13. The specific communication system predetermined in the storage unit 13 is assumed to be HSDPA in this description, but the system is not limited to this, and may be HSUPA, for example.

First it is assumed that the mobile station 1 camps on an area where cells C1 to C4 are close together. Here the cells C1 to C3 are HSDPA cells (indicated by solid white areas), where an HSDPA communication system can be used, and the cell C4 is a non-HSDPA cell (indicated by hatched area), where an HSDPA communication system cannot be used. Initially the mobile station 1 acquires a plurality of pieces of cell information on cells C1 to C4, which the mobile station 1 can camp on, and on whether HSDPA can be used in each of the cells C1 to C4 from the broadcast information received from a plurality of communication base stations (not illustrated).

Then the mobile station 1 selects the cell C1, which is an HSDPA cell, from the plurality of pieces of cell information, and camps on the cell C1 after the above camping process. Here the storage unit 13 stores the history information on cell C1, which is the camping cell. If the cell is changed because the mobile station 1 moves, for example, the control unit 15 selects a cell from the cell information based on the history information on the stored cell C1, and performs camping process on this selected cell.

In this case, the received signal level of the broadcast information in cells, indicated in the history information stored in the storage unit 13, may be corrected according to an arbitrary correction value which the user of the mobile station 1 inputs via the operation unit 14, so that a specific cell is more easily selected with priority out of the cells C1 to C3. For example, if the received signal level of the broadcast information, which includes the cell information on the cell C3, is A, and the received signal level of the broadcast information, which includes the cell information on the cell C4, is B, then A is corrected by adding a correction value x, that is, A+x is calculated, and the control unit 15 selects a cell (e.g. cell C3) from the cell information based on A+x and B (e.g. by comparison), and performs camping process. Multiplication, instead of addition, may be used for correction. In this way, the mobile station 1 can camp on a specific cell (cell C3 in this case) by adjusting the correction value which the user of the mobile station 1 inputs.

Then it is assumed that the mobile station 1 transits (or moves) from the cell C1, the current camping cell, to C2, C3 and C4 sequentially, as shown in FIG. 4. Here it is assumed that the mobile station 1 selected only the cells C2 and C3, which are HSDPA cells, as cells where a specific communication system can be used, out of the transit destination cells C2, C3 and C4. If the mobile station 1 transits to the cell C2 and selects and camps on this cell, the storage unit 13 adds the history information on the cell C2 as a camped cell to the cell C1, and stores it. Then if the mobile station 1 transits to the cell C3 and selects and camp on this cell, the storage unit 13 adds the history information on the cell C3, as a camped cell, to the cells C1 and C2, and stores it. Even if the mobile station 1 transits to the cell C4 and camps on this cell, the history information in the storage unit 13 is not changed, since the mobile station 1 has not selected the cell C4 as a cell where the specific communication system can be used.

Then it is assumed that the mobile station 1 transits under the same conditions as FIG. 4, when conditions to delete the history information are set in the storage unit 13, as shown in FIG. 5. If the mobile unit 1 transits to the cell C2 and selects and camps on this cell, the storage unit 13 adds the history information on the cell C2 as a camped cell to the cell C1, and stores it.

Then if the mobile unit 1 transits to the cell C3 and selects and camps on this cell, the storage unit 13 adds the history information on the cell C3, as a camped cell, to the cells C1 and C2, and stores it. In this case, the total number of times of the camping process by the control unit 15 has reached a predetermined number (twice in this case), since the history information on the cell C1 is stored, so the above mentioned conditions are satisfied, and the history information on the cell C1 is deleted (indicated by the hatched area).

Even if the mobile station 1 transits to the cell C4 and camps on this cell, the storage unit 13 does not add the history information, since the mobile station 1 has not selected the cell C4 as a cell where the specific communication system can be used. In this case, a predetermined time (valid period of history information on the cell C2) has elapsed since the history information on the cell C2 is stored, so the above mentioned conditions are satisfied, and the history information on the cell C2 is deleted (indicated by hatched area).

Figure 6:
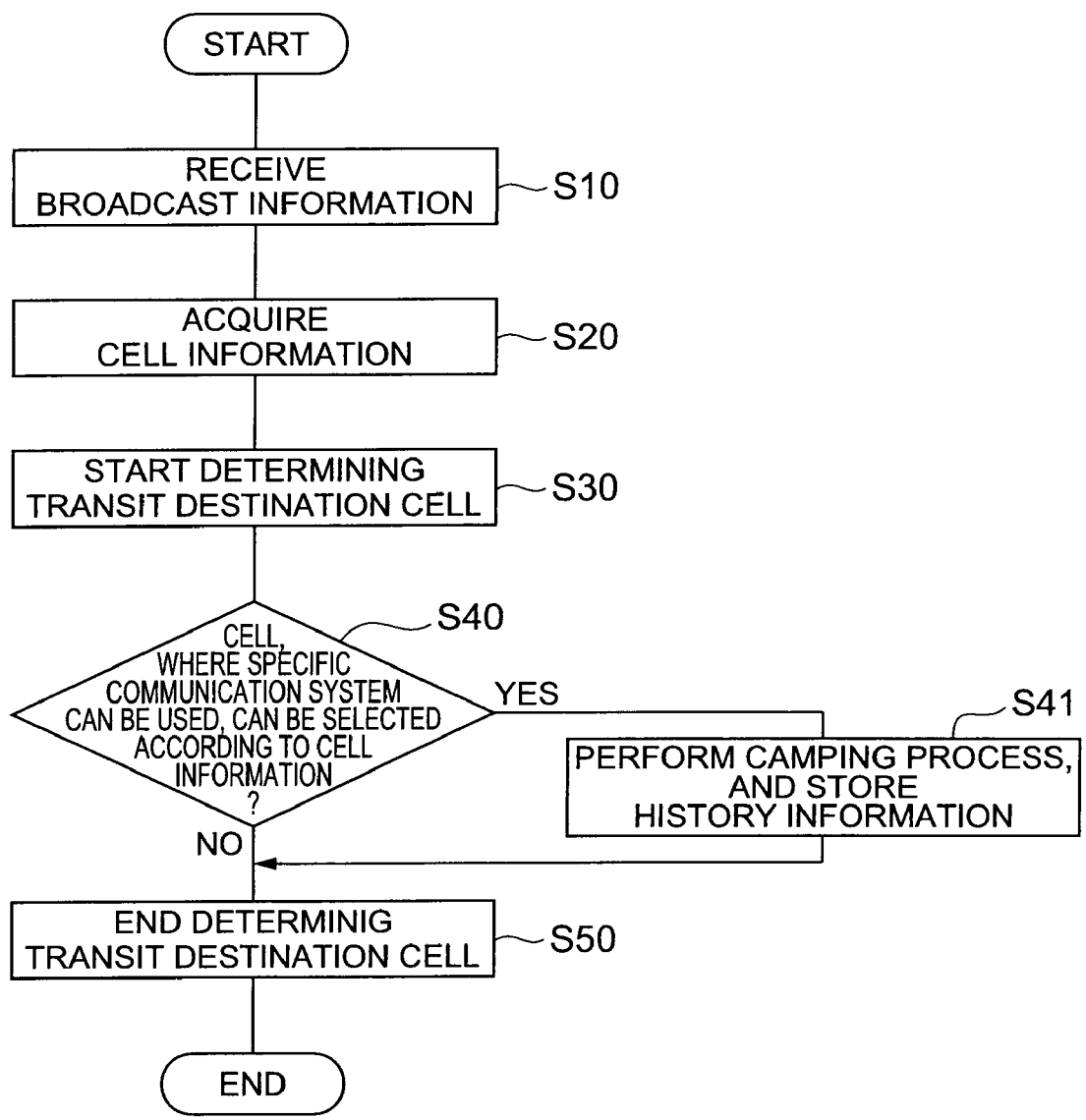
FIG. 6 is a flow chart depicting a first example of a processing flow of the mobile station.
Figure 7:
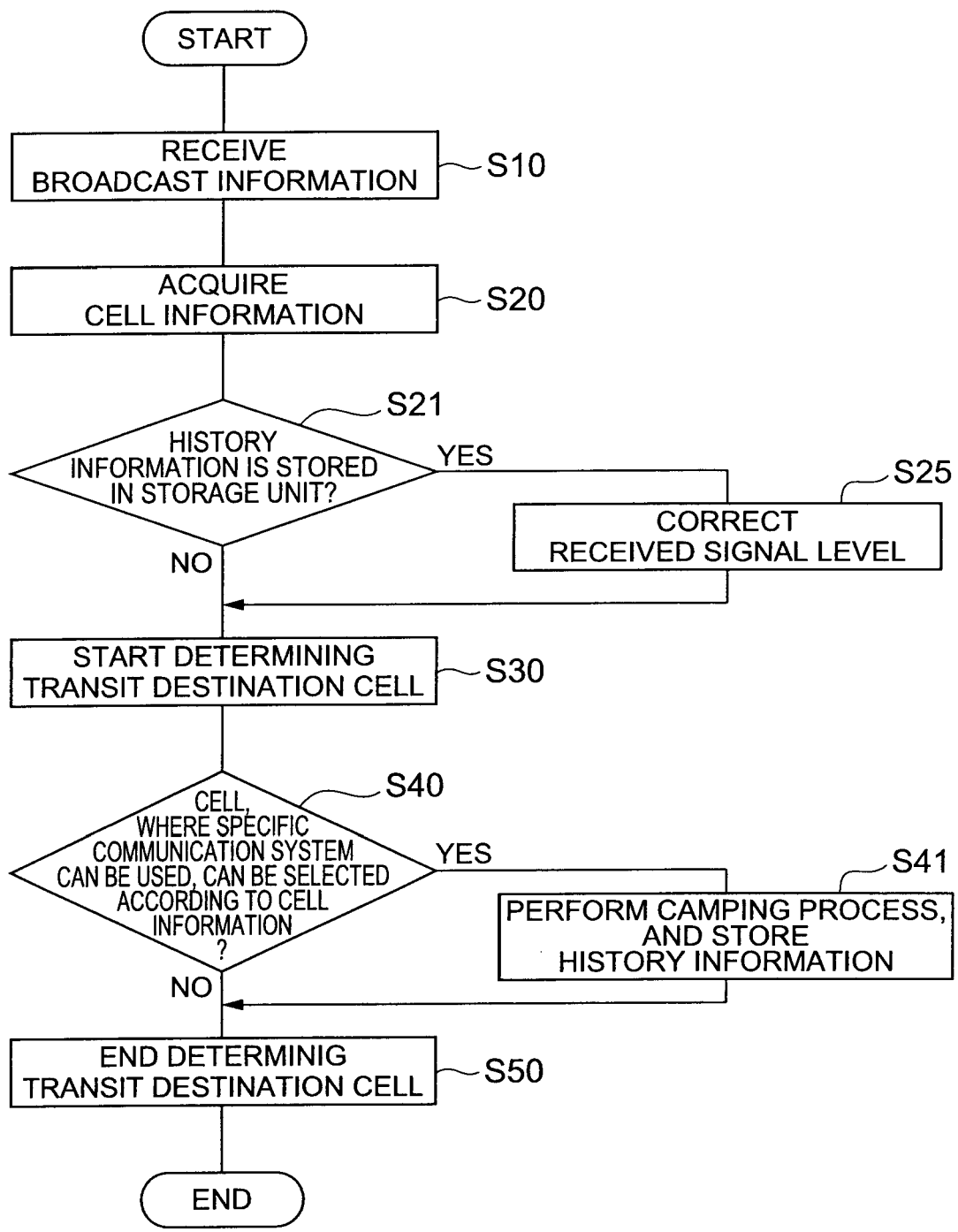
FIG. 7 is a flow chart depicting a second example of a processing flow of the mobile station.
Figure 8:
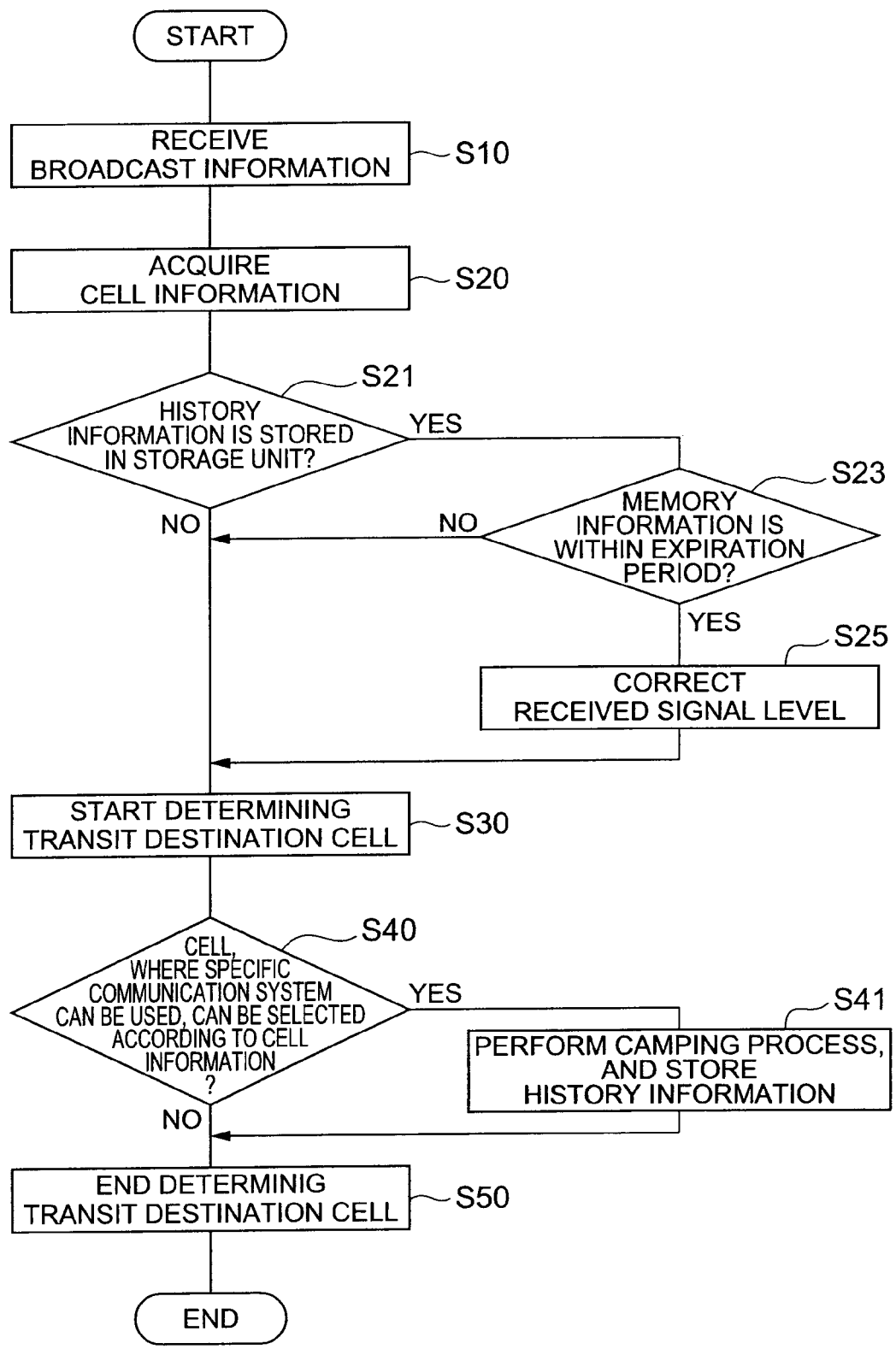
FIG. 8 is a flow chart depicting a third example of a processing flow of the mobile station.

Now a flow of a processing (communication system selection method) performed in the mobile station 1 will be described. FIG. 6 to FIG. 8 are flow charts depicting a first example, second example and third example respectively of the processing flow performed in the mobile station 1.

The first example will be described first. As FIG. 6 shows, when the mobile station 1 receives broadcast information from a plurality of communication base stations first (step S10, reception step), a plurality of pieces of cell information is acquired from the broadcast information (step S20, acquisition step). The cell information refers to information on cells which the mobile station 1 can camp on and on communication systems which can be used in the cells. Then the mobile station 1 starts processing to determine a transit destination cell (step S30). Specifically, the mobile station 1 starts selecting a transit destination cell where the specific communication system can be used based on the history information stored in the storage unit 13.

Here the control unit 15 determines whether the cell, where the specific communication system can be used, can be selected or not based on the plurality of pieces of cell information acquired in step S20 (step S40). If a cell where the specific communication system can be used is included in the plurality of pieces of cell information and can be selected, the camping process is performed for this cell, and the history information on this cell is stored as a camped cell (step S41), and processing moves to step S50. If a cell where the specific communication system can be used is not included in the cell information and cannot be selected, on the other hand, processing moves to the later mentioned step S50. In step S50, the mobile station 1 ends the transit destination cell determination processing. The steps S30, S40, S41 and S50 correspond to the selection processing step.

Now the second example will be described. As FIG. 7 shows, when the mobile station 1 receives broadcast information from a communication base station (step 10, reception step), cell information is acquired from the broadcast information (step S20, acquisition step).

Then the control unit 15 determines whether the history information is stored in the storage unit 13 (step S21). If the history information is stored in the storage unit 13, the received signal level is corrected by the correction value which is input via the operation unit 14 (step S25), and then processing moves to step S30. If the history information is not stored in the storage unit 13, on the other hand, processing moves to the above mentioned step S30. The processing flow to transit to step S30 is the same as the first example.

Now the third example will be described. As FIG. 8 shows, when the mobile station 1 receives broadcast information from a communication base station (step S10, reception step), cell information is acquired from the broadcast information (step S20, acquisition step).

Then the control unit 15 determines whether the history information is stored in the storage unit 13 (step S21). If the history information is not stored in the storage unit 13, processing moves to step S30. If the history information is stored in the storage unit 13, on the other hand, the control unit 15 judges whether the stored history information is within the expiration period (step S23). If the history information is not within the expiration period, processing moves to the above mentioned step S30. If the history information is within the expiration period, on the other hand, processing moves to the above mentioned step S25. The processing flow to transit to step S25 and S30 is the same as the second example.

As described above, according to the mobile station 1 and the communication system selection method of the present invention, the mobile station 1 acquires a plurality of pieces of cell information from the broadcast information received in the reception step. Then based on the history information, the mobile station 1 selects one cell where a specific communication system can be used, and performs processing to camp on this cell in the selection processing step. By this, the mobile station 1 camps on a cell where the specific communication system can be used, so communication using a specific communication system, such as HSDPA or HSUPA, can be performed with priority. Also based on the history information, a cell where a specific communication system can be used is selected. Therefore a cell which is most appropriate to perform communication using the specific communication system can be selected based on the history of the mobile station 1.

Also history information on a camped cell, which the mobile station 1 has not camped on until at least one of the above mentioned two conditions is satisfied, is deleted, so a cell which is most appropriate to perform communication using the specific communication system can be selected in a short time.

Also based on the received signal level corrected by a correction value which the user of the mobile station 1 inputs to the operation unit 14, the control unit 15 selects a cell where a specific communication system can be used from the cell information, and performs processing for the mobile station 1 to camp on this cell. As a result, the mobile station 1 can camp on a specific cell by the user of the mobile station 1 adjusting the correction value to be input to the operation unit 14.

Also based on the received signal level corrected by a correction value pre-stored in the storage unit 13, the control unit 15 selects a cell where a specific communication system can be used from the cell information, and performs processing for the mobile station 1 to camp on this cell. As a result, the mobile station 1 can camp on a specific cell by the user of the mobile station 1 adjusting the correction value to be stored in the storage unit 13.

Also the mobile unit 1 can perform high-speed data communication using at least one communication system out of HSDPA and HSUPA with priority.

The present invention of the inventor was described in concrete terms based on embodiments, but the present invention is not limited to the above embodiments, and can be modified in various ways. For example, a specific communication system is not limited to HSDPA and HSUPA. In the case when the mobile station 1 camps on a cell where a specific communication system cannot be used, because the level of communication services provided to the mobile station 1 (communication capability such as communication speed), for example, is insufficient, then a transit destination cell may be determined based not only on the received signal level of the broadcast information corrected with the correction value, but also on whether both the received signal level and this communication service level are at predetermined reference levels or more.

For example, if a transit destination cell is in packet bearer control status when the mobile station 1 is communicating packets, a transit destination cell may be determined based not only on the received signal level of the broadcast information corrected with the correction value, but based on this received signal level and the above mentioned level of packet communication service (that is, whether packet communication can be used or not).

What is claimed is:

1. A mobile station for performing communication using a specific communication system, comprising:
   a storage unit configured to store history information of camped cells which the mobile station has camped on;
   a user interface configured to receive a correction value input by a user via the user interface for correcting, in an increasing direction, a received signal level of broadcast information of a cell indicated by the history information of camped cells stored in the storage unit;
   a reception unit configured to receive broadcast information from a plurality of communication base stations;
   an acquisition unit configured to acquire a plurality of pieces of cell information on cells which the mobile station can camp on and on communication systems which can be used in the cells from the broadcast information received by the reception unit; and
   a selection processing unit configured to select one cell where the specific communication system can be used from the plurality of pieces of cell information acquired by the acquisition unit based on the received signal level corrected by the correction value received at the user interface, and perform processing for the mobile station to camp on the cell, wherein
   the user interface receives the correction value and an identification of the cell to which the correction value is to be applied so that the cell is more likely to be selected as the cell to camp on by the selection processing unit, and
   the received correction value is a value that is added to the received signal level of the cell so that the cell is more likely to be selected as the cell to camp on by the selection processing unit.

2. The mobile station according to claim 1, wherein the storage unit deletes history information of camped cells which satisfies a condition that a predetermined time has elapsed since the history information of camped cells is stored.

3. The mobile station according to claim 1, wherein the specific communication system is at least one of HSDPA and HSUPA.

4. A communication system selection method, using a mobile station which performs communication using a specific communication system, comprising:
   storing, by a memory of the mobile station, history information of camped cells which the mobile station has camped on;
   receiving, at a user interface of the mobile station, a correction value input by a user via the user interface for correcting, in an increasing direction, a received signal level of broadcast information of a cell indicated by the stored history information of camped cells;
   receiving, at the mobile station, broadcast information from a plurality of communication base stations;
   acquiring, by the mobile station, a plurality of pieces of cell information on cells which the mobile station can camp on and on communication systems which can be used in the cells from the broadcast information received in the reception step; and
   selecting, by the mobile station, one cell where the specific communication system can be used from the acquired plurality of pieces of cell information based on the received signal level corrected by the correction value; and
   performing, by the mobile station, processing for the mobile station to camp on the cell, wherein
   the receiving, at the user interface, includes receiving the correction value and an identification of the cell to which the correction value is to be applied so that the cell is more likely to be selected as the cell to camp on by the selection processing unit, and
   the received correction value is a value that is added to the received signal level of the cell so that the cell is more likely to be selected as the cell to camp on by the selecting.

5. A mobile station for performing communication using a specific communication system, comprising:
   a storage unit configured to store history information of camped cells which the mobile station has camped on;
   a user interface configured to receive a correction value input by a user via the user interface for correcting, in an increasing direction, a received signal level of broadcast information of a cell indicated by the history information of camped cells stored in the storage unit;
   a reception unit configured to receive broadcast information from a plurality of communication base stations;
   an acquisition unit configured to acquire a plurality of pieces of cell information on cells which the mobile station can camp on and on communication systems which can be used in the cells from the broadcast information received by the reception unit; and
   a selection processing unit configured to select one cell where the specific communication system can be used from the plurality of pieces of cell information acquired by the acquisition unit based on the received signal level corrected by the correction value received at the user interface, and perform processing for the mobile station to camp on the cell, wherein
   the user interface receives the correction value and an identification of the cell to which the correction value is to be applied so that the cell is more likely to be selected as the cell to camp on by the selection processing unit, and
   the received correction value is a multiplier, and the received signal level of the cell is multiplied by the multiplier so that the cell is more likely to be selected as the cell to camp on by the selection processing unit.

6. A communication system selection method, using a mobile station which performs communication using a specific communication system, comprising:
   storing, by a memory of the mobile station, history information of camped cells which the mobile station has camped on;
   receiving, at a user interface of the mobile station, a correction value input by a user via the user interface for correcting, in an increasing direction, a received signal level of broadcast information of a cell indicated by the stored history information of camped cells;
   receiving, at the mobile station, broadcast information from a plurality of communication base stations;
   acquiring, by the mobile station, a plurality of pieces of cell information on cells which the mobile station can camp on and on communication systems which can be used in the cells from the broadcast information received in the reception step; and
   selecting, by the mobile station, one cell where the specific communication system can be used from the acquired plurality of pieces of cell information based on the received signal level corrected by the correction value; and performing, by the mobile station, processing for the mobile station to camp on the cell, wherein the receiving, at the user interface, includes receiving the correction value and an identification of the cell to which the correction value is to be applied so that the cell is more likely to be selected as the cell to camp on by the selection processing unit, and the received correction value is a multiplier, and the received signal level of the cell is multiplied by the multiplier so that the cell is more likely to be selected as the cell to camp on by the selection processing unit.

* * * * *